(12) United States Patent
Shin et al.

(10) Patent No.: US 9,554,041 B1
(45) Date of Patent: Jan. 24, 2017

(54) PORTABLE CAMERA

(71) Applicant: LG ELECTRONICS INC., Seoul (KR)

(72) Inventors: Jiyong Shin, Seoul (KR); Sanghyuk Im, Seoul (KR); Sunglyong Cha, Seoul (KR); Mattew Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/183,230

(22) Filed: Jun. 15, 2016

Related U.S. Application Data

(60) Provisional application No. 62/276,251, filed on Jan. 8, 2016.

(30) Foreign Application Priority Data

Jan. 25, 2016 (KR) ........................ 10-2016-0008917

(51) Int. Cl.
*H04N 5/232* (2006.01)
*H04N 5/247* (2006.01)
*H04N 5/225* (2006.01)

(52) U.S. Cl.
CPC ........ *H04N 5/23238* (2013.01); *H04N 5/2252* (2013.01); *H04N 5/2328* (2013.01); *H04N 5/247* (2013.01)

(58) Field of Classification Search
CPC .. A45C 11/00; A45C 11/38; A45F 2200/0533; Y10S 224/908; Y10S 292/48
See application file for complete search history.

(56) References Cited

U.S. PATENT DOCUMENTS 6,308,394 B1   10/2001  Boe
2002/0159774 A1*  10/2002  Koyama ............. H04N 5/2251
                                                         396/505
(Continued)

FOREIGN PATENT DOCUMENTS

EP       2933997 A1    10/2015
JP     2011-97158 A     5/2011
(Continued)

OTHER PUBLICATIONS

Author Unknown, "Ricoh Theta m15, 360-Degree Spherical Panorama Camera with Video Capability," Oct. 30, 2014, 19 pages, www.Popco.net, with an English translation.
(Continued)

*Primary Examiner* — Christopher K Peterson
(74) *Attorney, Agent, or Firm* — Birch, Stewart, Kolasch & Birch, LLP

(57) ABSTRACT

A portable camera including a housing including a pair of apertures formed on a front surface and a rear surface, an imaging unit including a pair of lens units exposed through the pair of apertures and mounted inside the housing, and a main board controlling the imaging unit. The imaging unit includes a pair of camera modules respectively facing directions of the front surface and the rear surface of the housing, a camera bracket between the pair of camera modules, and a pair of adhesive tapes between the camera modules and the camera bracket. The portable camera may provide a 360-degree panorama image without having to move the camera, and the portable camera may also may minimize any distortion occurring in the panorama image in accordance with the rotation speed of the portable camera, when capturing (or taking) the panorama image by moving and turning the camera.

15 Claims, 7 Drawing Sheets

(56) References Cited

U.S. PATENT DOCUMENTS

| | | | |
|---|---|---|---|
| 2003/0160862 A1* | 8/2003 | Charlier | H04N 5/23238 |
| | | | 348/14.08 |
| 2006/0082509 A1* | 4/2006 | Lee | H01Q 1/22 |
| | | | 343/702 |
| 2009/0017867 A1* | 1/2009 | Koh | H04M 1/0264 |
| | | | 455/556.1 |
| 2009/0194444 A1* | 8/2009 | Jones | A45C 3/00 |
| | | | 206/320 |
| 2012/0194997 A1* | 8/2012 | McClure | G06F 1/1626 |
| | | | 361/679.55 |
| 2013/0242040 A1* | 9/2013 | Masuda | H04N 5/2251 |
| | | | 348/36 |
| 2014/0176792 A1* | 6/2014 | Cao | H04N 5/2257 |
| | | | 348/376 |

FOREIGN PATENT DOCUMENTS

| | | |
|---|---|---|
| KR | 10-2006-0104020 A | 10/2006 |
| KR | 10-0730765 B1 | 6/2007 |
| KR | 10-0769425 B1 | 10/2007 |
| KR | 10-2015-0120842 A | 10/2015 |

OTHER PUBLICATIONS

Li Zhongdao, "Dismantlement of Panoramic Camera Ricoh Theta," Jan. 24, 2014, 18 pages, www.people.com.cn, with an English translation.

Xueming, "Teardown of Ricoh Theta 360 Degree Spherical Panorama Camera," Blog at WordPress.com, Nov. 12, 2015, 30 pages.

\* cited by examiner

PORTABLE CAMERA

This application claims priority to Korean Patent Application No. 10-2016-0008917 filed on Jan. 25, 2016 and U.S. Provisional Application No. 62/276,251 filed on Jan. 8, 2016, the entire contents of which are hereby incorporated by reference in their entireties.

BACKGROUND OF THE INVENTION

Field of the Invention

The present invention relates to a portable camera that is capable of performing 360-degree capturing (or imaging).

Discussion of the Related Art

A general camera is equipped with a camera module that faces one side, and, in order to capture another side, the direction of the camera is required to be changed. Although mobile user equipment (or terminals) equipped with a camera module on each of its front surface and its rear surface are being introduced, each camera module is independently controlled and is not inter-connected to one another.

The related art camera is disadvantageous in that it requires an operation of turning the direction of the camera in order to capture a 360-degree image, and, in this case, if the rotation speed is not consistent or if the camera is shaken along a vertical direction, the image may become distorted.

SUMMARY OF THE INVENTION

Accordingly, the present invention is directed to a portable camera that substantially obviates one or more problems due to limitations and disadvantages of the related art.

An object of the present invention is to provide a portable camera that is capable of performing 360-degree capturing (or imaging) by using a pair of camera modules respectively facing directions of a front surface and a rear surface of the portable camera.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, provided herein is a portable camera including a housing including a pair of apertures formed on a front surface and a rear surface, an imaging unit including a pair of lens units being exposed through the pair of apertures and being mounted inside the housing, and a main board controlling the imaging unit, wherein the imaging unit includes a pair of camera modules respectively facing directions of the front surface and the rear surface of the housing, a camera bracket positioned between the pair of camera modules, and a pair of adhesive tapes positioned between the camera modules and the camera bracket.

The camera module may include a fisheye lens having an angle of coverage of 180 degrees (180°) or more, and the main board may correct any distortion occurring in images captured by the pair of camera modules and synthesize the corrected images, thereby being capable of providing a panorama image.

The pair of camera modules may include a lens unit, an imaging element recording light being introduced through the lens unit, a camera flexible board delivering information collected by the imaging element to the main board, and a pair of camera connectors each being positioned on an end portion of the camera flexible board and being connected to the main board.

The pair of camera connectors may be respectively coupled to a front surface and a rear surface of the main board.

The pair of camera modules may further include a projection protruding from a surface contacting the camera bracket, and a hole being formed on the camera bracket and having the projection inserted therein.

The portable camera may further include an antenna module including a pattern unit attached inside the housing and a terminal unit extending from the pattern unit and being positioned inside the rear surface of the housing, and an elastic clip being mounted on the rear surface of the main board and contacting the terminal unit.

The portable camera may further include a guidance projection protruding from an inner surface of the housing, and a guidance recess being formed on the antenna module and corresponding to the guidance projection.

The portable camera may include three or more microphone holes being formed on an outer surface of the housing and forming one flat surface, and three or more microphones being positioned on the housing with respect to the microphone holes.

The housing may further include a camera decoration covering circumferences of the first aperture and the second aperture and fixing the imaging unit, and the microphone holes may be positioned to be adjacent to an end portion of the camera decoration.

The portable camera may further include a battery being positioned on the front surface of the main board, and a flexible board being positioned on a front surface of the battery and being connected to the main board, and the microphone may include a first microphone being mounted on the flexible board, and a second microphone and a third microphone being mounted on the main board.

The imaging unit may be positioned to be adjacent to an upper portion of the main board, the main board may be projected along left and right sides of the imaging unit so as to form a U-shape, and the second microphone and the third microphone may be respectively positioned on each end portion of the U-shaped main board.

The portable camera may further include a front surface button being positioned on the front surface of the housing, and a metallic dome being positioned on a rear surface of the front surface button, so as to generate a signal when pressure is applied to the front surface button, and being formed on the flexible board.

The portable camera may provide a 360-degree panorama image without having to move the camera, and the portable camera may also may minimize any distortion occurring in the panorama image in accordance with the rotation speed of the portable camera, when capturing (or taking) the panorama image by moving and turning the camera.

Furthermore, the related art fisheye lens may be used, and, since a pair of camera modules exists independently, and since only one of the camera modules may be replaced when carrying out maintenance and repair, this is more advantageous in light of the maintenance and repair of the portable camera.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
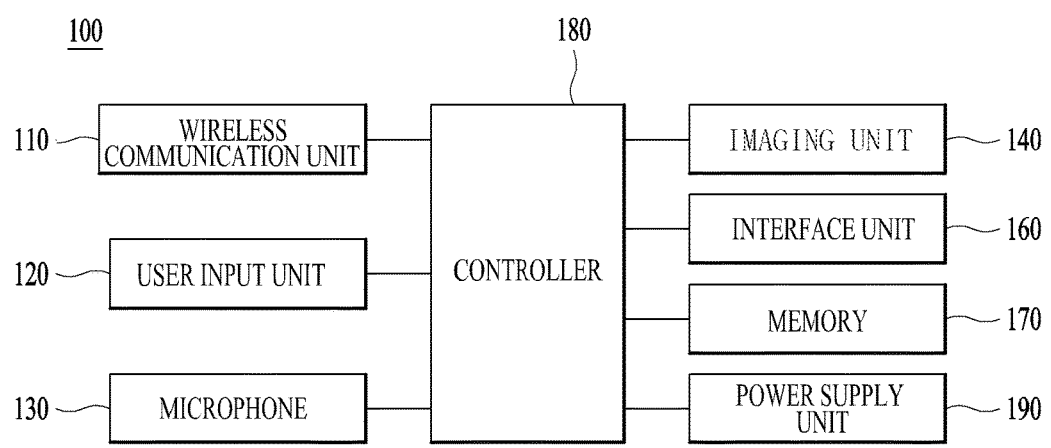
FIG. 1 illustrates a block diagram of a portable camera according to an embodiment of the present invention.

FIG. 1 illustrates a block diagram for describing the configuration of a portable camera 100 according to an embodiment of the present invention. Herein, the portable camera 100 may include a wireless communication unit 110, a user input unit 120, a microphone 130, an imaging unit 140, an interface unit 160, a memory 170, a controller 180, and a power supply unit 190.

Since the configuration elements shown in FIG. 1 do not correspond to the essential configuration elements of the portable camera 100, the portable camera 100 that is described in this specification may have more or less configuration elements than those listed above.

More specifically, among the configuration elements that are listed above, the wireless communication unit 110 may include one or more modules that allow wireless communication to be carried out between an external user equipment and the portable camera 100. An image captured through the wireless communication unit 110 may be transmitted to an external server or a user equipment, or the portable camera 100 may be wirelessly controlled through the wireless communication unit 110.

As a main example of a wireless communication technology that is applied to the portable camera 100, a short range wireless communication technology, such as Bluetooth and Wi-Fi, is mostly used.

Bluetooth refers to a short-range wireless technology standard, which allows information to be exchanged between electronic devices located within 10 meters (m), and Bluetooth is used each time a low-power wireless connection is required. In case the portable camera 100 and the user are located in separate places, the user may control the portable camera 100 by using the Bluetooth technology. Bluetooth uses 2400~2483.5 MHz, which corresponds to an ISM (Industrial Scientific and Medical) frequency band. Herein, in order to prevent interference occurring from other systems using frequencies above and below the ISM frequency band, Bluetooth uses a total of 79 channels ranging from 2402~2480 MHz, which corresponds to a range excluding 2 MHz starting from 2400 MHz and 3.5 MHz up to 2483.5 MHz from the ISM frequency band.

Since Bluetooth uses the same frequency band with a plurality of other systems, and since wave interference is liable to occur between systems, Bluetooth uses a Frequency Hopping method. Frequency Hopping refers to transmitting data through a large number of channels in accordance with a specific pattern. However, in this case, in order to be capable of transmitting data in accordance with the specific pattern, synchronization between the Bluetooth devices should be established. By varying the pattern, a plurality of slave devices may be connected to a master device.

Meanwhile, the Wi-Fi (Wireless Fidelity) technology corresponds to a short-range computer networking method, and, depending upon the device type and the usage mode, the Wi-Fi technology is divided into an infrastructure mode, wherein an Access Point (AP) delivering radio signals transmits and receives data to and from a plurality of neighboring user equipment existing within a predetermined radius, and an ad hoc mode, wherein only the Access Points transmit and receive data to and from one another in a P2P format.

In the Wi-Fi technology, the ad hoc method for transmitting data between devices is most widely used, and, when transmitting an image captured (or taken) by the portable camera 100 to an external user equipment, the Wi-Fi technology may be used. The Wi-Fi technology uses a frequency band of 2.4 GHz and, by using a frequency band that is similar to the frequency band used in the above-described Bluetooth technology, both technologies may be used by using one antenna module 111.

A user input unit is used for receiving information from the user. And, when information is inputted through the user input unit 120, the controller 180 may control the operations of the portable camera 100 with respect to the inputted information. Such user input unit 120 may include a mechanical inputting means (or a mechanical key, e.g., a button located on front/rear surfaces or side surfaces of the mobile user equipment 100, a dome switch, a jog wheel, a jog switch, and so on) and a touch-type inputting means.

Figure 2A:
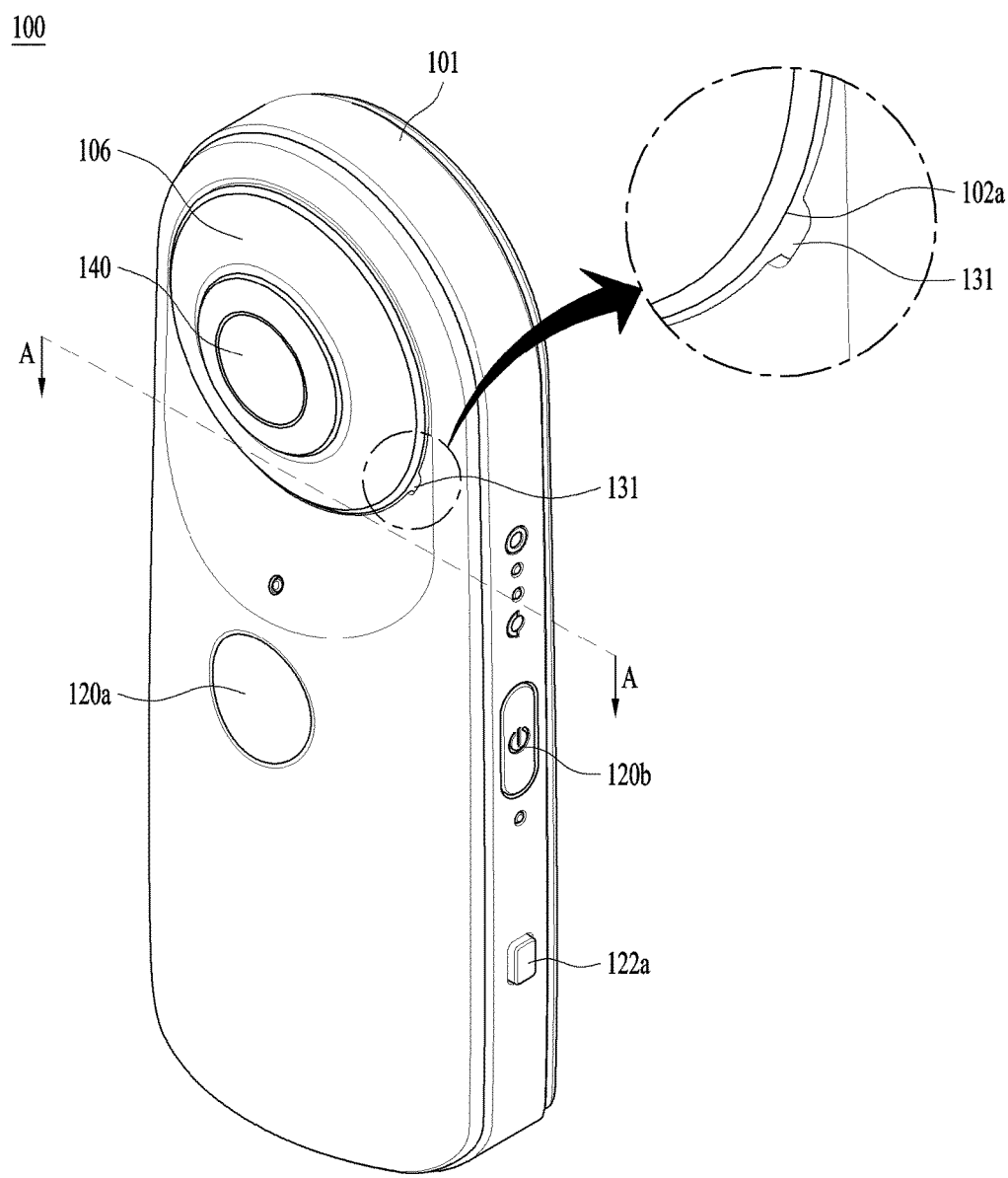
FIG. 2A illustrates a perspective view of a front surface of a portable camera according to an embodiment of the present invention.
Figure 2B:
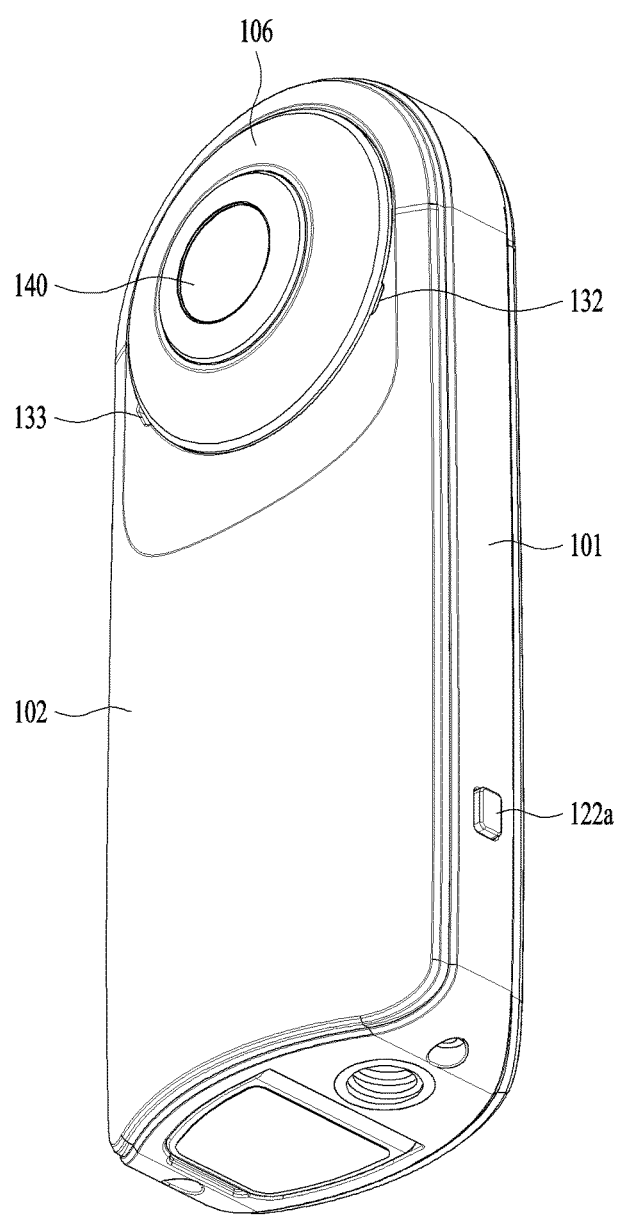
FIG. 2B illustrates a perspective view of a rear surface of a portable camera according to an embodiment of the present invention.

Referring to FIG. 2A and FIG. 2B, the user input unit 120 according to an embodiment of the present invention is equipped with a first button 120a for capturing images and a second button 120b for turning the power ON/OFF. And, as required, the user input unit 120 may be equipped with more buttons or additional touch-type input units.

Although the button is minimized, by connecting the user input unit 120 to an external user equipment through the wireless communication unit 110 or the interface unit 160, a more detailed control may be carried out. Alternatively, in accordance with a time length during which the button is pressed, or in accordance with an order (or sequence) by which multiple buttons are pressed, the command that can be inputted by the user may be expanded.

For example, the touch-type inputting means may be realized in the form of a virtual key, which is displayed on the touchscreen by performing software-based processing, a soft key, or a visual key, or the touch-type inputting means may be realized in the form of a touch key that is positioned in a portion other than the touchscreen. Meanwhile, the virtual key or visual key may be displayed on the touchscreen in diverse formats, and, for example, the virtual key or visual key may be realized in the form of graphic, text, icon, video, or a combination of the above.

The microphone 130 processes an external acoustic signal (or sound signal) to electronic sound data. The processed sound data may be diversely used in accordance with the function that is being executed (or the application that is being executed) in the mobile user equipment (or portable camera) 100. Meanwhile, diverse noise elimination algorithms for eliminating noise that occurs during the process of receiving the external sound signal may be realized in the microphone 130. Additionally, in case the portable camera 100 is equipped with a plurality of microphones 130, a stereophonic sound (or stereo sound) may be received.

The imaging unit 140 includes a lens and an image sensor, which stores light passing through the lens as digital data. In case of storing the data consecutively, a moving picture image (or video) may be provided, and, in case of storing an instant image, a still image (or photo) may be provided. The data may be stored in the memory 170, which is equipped in the imaging unit 140, and, as described above, the data may be transmitted to an external storage device through the wireless communication unit 110. The imaging unit 140 according to an embodiment of the present invention is equipped to each of the front surface and the rear surface, thereby enabling 360-degree panorama images to be acquired.

When the portable camera 100 is connected to an external cradle, the interface unit may become a path for supplying the portable camera 100 with power from the cradle or path for delivering diverse command signals, which are inputted to the cradle by the user, to the portable camera 100. The diverse command signals or power being inputted from the cradle may be operated as a signal for recognizing that the portable camera 100 has been correctly fastened to the cradle.

The memory 170 stores image data inputted from the imaging unit 140 of the portable camera 100 and also stores data, command language, and so on, which are used for driving the portable camera 100. The memory 170 may be expanded by mounting additional memory cards.

The controller 180 transmits control signals to each configuration element, and, by processing signals and/or data inputted through the user input unit 120, the microphone 130, and the imaging unit 140, the controller 180 controls other assembly parts or store data accordingly.

The power supply unit 190 receives external power and internal power in accordance with the control of the controller 180 and, then, supplies the power required for the operations of each configuration element. The power supply unit 190 includes a battery 191, and the battery 191 may correspond to an embedded battery 191 that can be recharged, and the battery 191 can be detachably fixed to a user equipment body for recharging.

Additionally, the power supply unit 190 is equipped with a connection port, and the connection port may be configured as an example of the interface 160 to which an external charger supplying power for recharging the battery 191 is electrically connected. As another example, the power supply unit 190 may be configured to recharge the battery 191 by using a wireless method without having to use the connection port. In this case, the power supply unit 190 may receive power from an external wireless power transmitting device by using at least one or more of an Inductive Coupling method, which is based upon magnetic induction, and a Magnetic Resonance Coupling method, which is based upon electromagnetic resonance.

Figure 3:
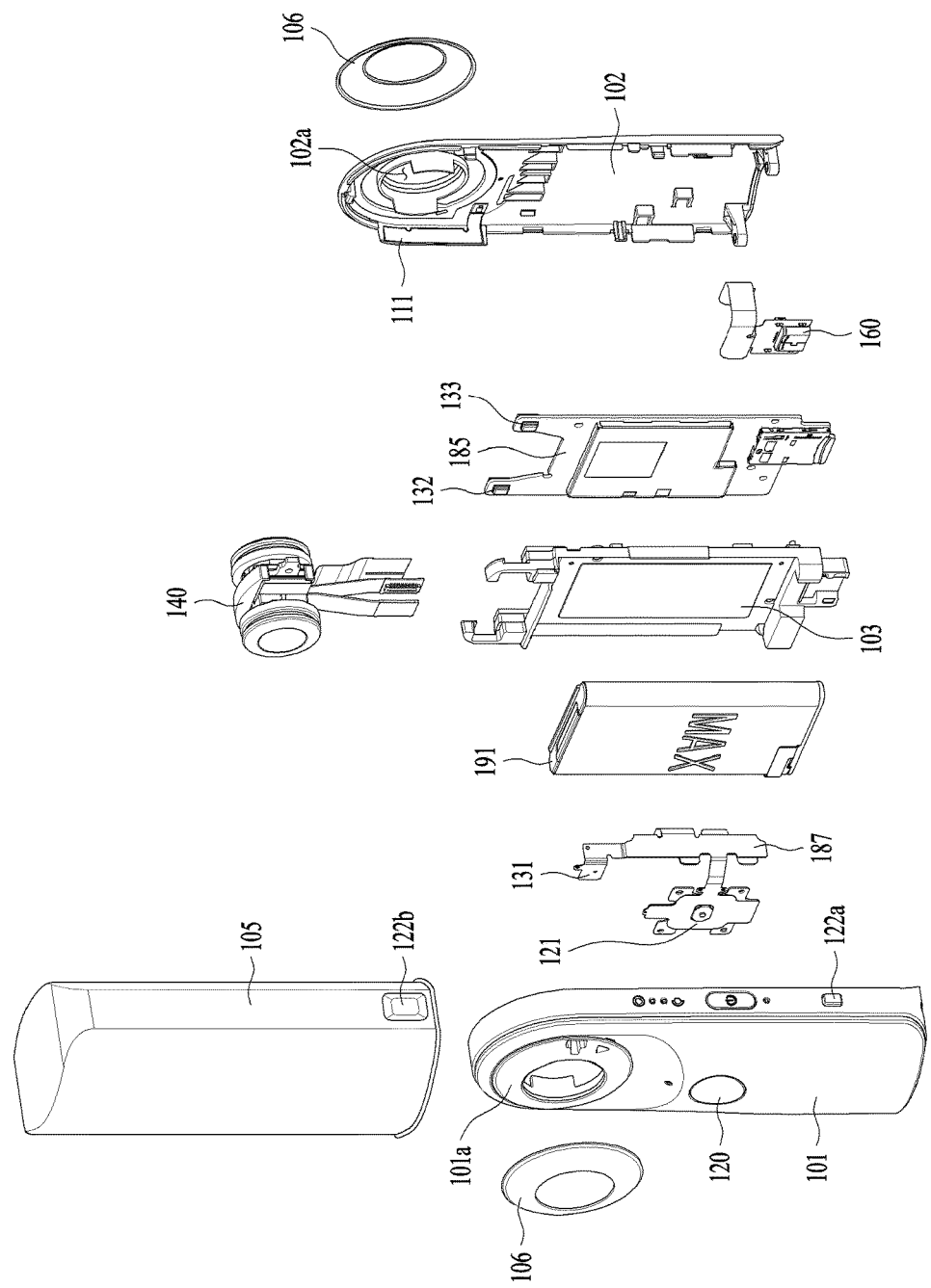
FIG. 3 illustrates a disassembled perspective view of a portable camera according to an embodiment of the present invention.

FIG. 2A illustrates a perspective view of a front surface of the portable camera 100 according to an embodiment of the present invention, and FIG. 2B illustrates a perspective view of a rear surface of the portable camera 100 according to an embodiment of the present invention. And, FIG. 3 illustrates a disassembled perspective view of the portable camera 100 according to an embodiment of the present invention. The portable camera 100 according to an embodiment of the present invention includes a housing, wherein assembly parts are mounted, and the portable camera 100 may further include a protective cap 105, which protects the protruded imaging unit 140 by covering the housing. For the coupling and detachment of the protective cap 105 to and from the portable camera 100, a hook 122a being inserted and released is protruded from a side surface of the housing, and the protective cap 105 includes a hook locking unit 122b in which the hook 122a is inserted. When the hook locking unit 122b is pressed, the hook 122a is detached (or released), and the housing may be detached from the protective cap 105.

As shown in FIG. 3, the housing may be configured of a front surface case 101 and a rear surface case 102. Apertures (or openings) 101a and 102a, wherein the lens of the imaging unit 140 is located, may be formed on an upper portion of the housing. Since the imaging unit 140 according to an embodiment of the present invention includes a pair of camera modules 141 respectively facing the directions of the front surface and the rear surface, the apertures (or openings) 101a and 102a may each be formed on the front surface case 101 and the rear surface case 102. The front surface and the rear surface of the housing may form a symmetrical structure, and, in order to be stably fixed, each of the front surface and the rear surface of the housing may include a flat bottom surface.

The reason why the imaging unit 140 is positioned on the upper portion is to allow the user to be capable of capturing images even when the portable camera 100 stands on a floor surface. However, if the imaging unit 140 is positioned too low, a problem may occur in that the imaging unit 140 may capture images the bottom (or floor), and, therefore, whenever required, in order adjust the height of the imaging unit 140, the bottom surface of the housing may be extended, so that the position of the imaging unit 140 can be higher than the floor surface. By further positioning a camera decoration 106 respective to the imaging unit 140 on a circumference of each aperture (or opening) 101a and 102a, the camera may be fastened.

A main board 185, the battery 191, the imaging unit 140, and so on, are positioned inside the housing, and a frame 103 on which the assembly parts that are mounted in the housing are securely fixed. The frame 103 may be formed of a metallic substance having rigidity, and may be used as a ground or emitter of the antenna, and so on. The main board 185 is mounted on a rear surface of the frame 103, and the battery 191 may be positioned on the front surface of the frame 103, and the frame 103 and the main board 185 may have their upper portions inserted in a U-shape, so that the imaging unit 140 can be securely fixed.

The main board 185 corresponds to a configuration element of the controller 180, and an IC that controls the portable camera 100 may be mounted on the main board 185. Moreover, the interface unit 160, the microphone 130, and so on, are also mounted on the main board 185, and, by being connected to the battery 191, the user input unit 120, the antenna module 111, and the camera module 141, the main board 185 controls the battery 191, the user input unit 120, the antenna module 111, and the camera module 141.

Since the microphone 130, the imaging unit 140, the user input unit 120, the interface unit 160, and so on, are dispersed and distributed on the front surface, the rear surface, and the side surfaces of the portable camera 100, the portable camera 100 may be further equipped with a separate flexible board, which is connected to the main board 185.

As shown in FIG. 3, a first unit input unit 120a, which is positioned on the front surface of the portable camera 100, uses a button flexible board 187 in order to be connected to the main board 185, which is positioned on the rear surface of the frame 103. A signal is generated by a metallic dome 121, which is pressed when pressure is applied on the first user input unit 120a, from the button flexible board 187, which is then delivered to the main board 185.

Apart from the signal of the first user input unit 120a, since the button flexible board 187 can transmit and receive signals of assembly parts positioned on the front surface, a first camera, which is positioned on the front surface, may be mounted on the button flexible board 187 and may transmit collected sound data to the main board 185.

Additionally, since the thickness of the battery 191, which is positioned on the front surface of the frame 103, is greater than the thickness of the main board 185, which is positioned on the rear surface of the frame 103, and since there is more surplus space on the front surface of the frame 103, accordingly, the interface unit 160 may be positioned on the front surface of the frame 103, and the interface unit 160 may be connected to the main board 185 through the flexible board.

Figure 4:
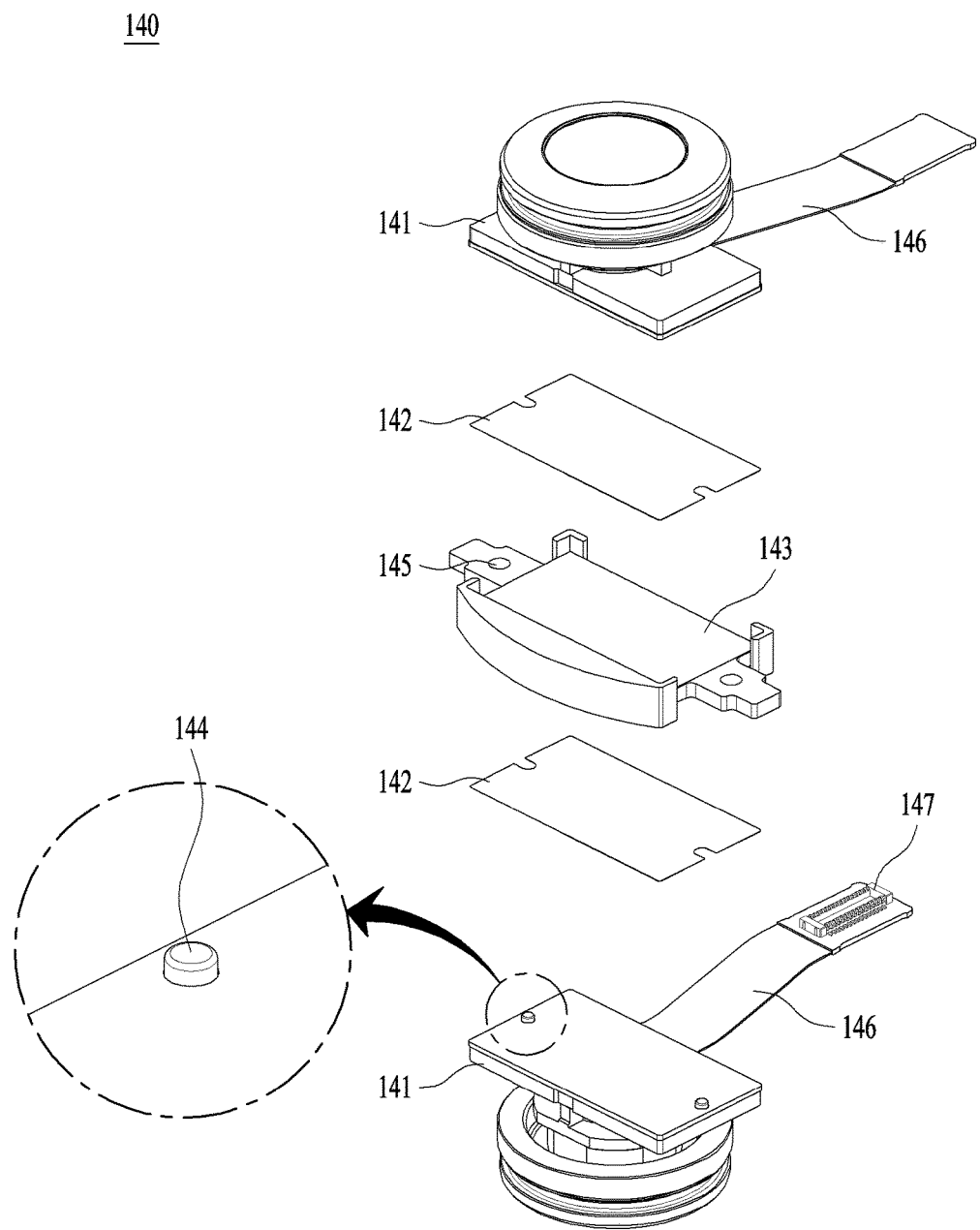
FIG. 4 illustrates a disassembled perspective view of an imaging unit included in a portable camera according to an embodiment of the present invention.

FIG. 4 illustrates a disassembled perspective view of the imaging unit 140 included in the portable camera 100 according to an embodiment of the present invention. The imaging unit 140 according to an embodiment of the present invention is embodied by attaching the same camera modules 141 opposite to one another, so as to respectively face the direction of the front surface and the direction of the rear surface. In case two identical camera modules 141 are used, camera modules 141 that are available in the market may be immediately applied, and, since the types of assembly parts are reduced, production may become easier. Additionally, if one of the pair of camera modules 141 is damaged, since it is sufficient to replace only the damaged camera module 141, the maintenance and repair cost may be reduced.

If the camera module 141 uses a fisheye lens, which has an angle of coverage of 180 degrees (180°) or more, images acquired from the pair of camera modules 141 may be synthesized, thereby creating a 360-degree (360°) panorama image.

Referring to FIG. 4, a bracket 143 is positioned between the pair of camera modules 141, and the camera modules 140 may be attached by using an adhesive tape 142 on the front surface and the rear surface of the bracket 143. In order to guide the attachment positions of the camera modules 141, a protrusion 144 is formed on the rear surface of the camera modules 141, and a respective hole 145 may be formed on the bracket 143.

The camera module 141 is configured of a lens and an image sensor, and, in order to deliver the image information that is digitalized by the image sensor to the main board 185, the camera module 141 is connected to the main board 185 through a camera flexible board 146.

Since the pair of camera modules 141 is positioned to respectively face the directions of the front surface and the rear surface, the imaging unit 140 faces the opposite direction of a camera connector 147, which is positioned on an end portion of the camera flexible board 146. Therefore, a connection part that connects to the camera connector 147 in the main board 185 is either separately equipped on the front surface and the rear surface, or a side of the camera flexible board 146 may be bent so that a pair of camera connectors 147 can be positioned to face the same direction.

In order to receive a stereo sound, the present invention uses a plurality of microphones 130. One microphone may be positioned along the direction of the front surface, and two microphones may be positioned along the direction of the rear surface, or two microphones may be positioned along the direction of the front surface, and one microphone may be positioned along the direction of the rear surface, or three or more microphones 131, 132, and 133 may be positioned. However, as the number of microphones becomes larger, there lies a problem in that the number of assembly parts also becomes larger, and, when a microphone hole 102c is formed in order to allow sound to be led into the microphone 130, there also lies a problem in that the microphone hole 102c degrades the quality of the external design of the portable camera 100. Therefore, it will be advantageous in the aspects of cost and design to reduce the number of microphones to a minimum number possible.

Figure 5:
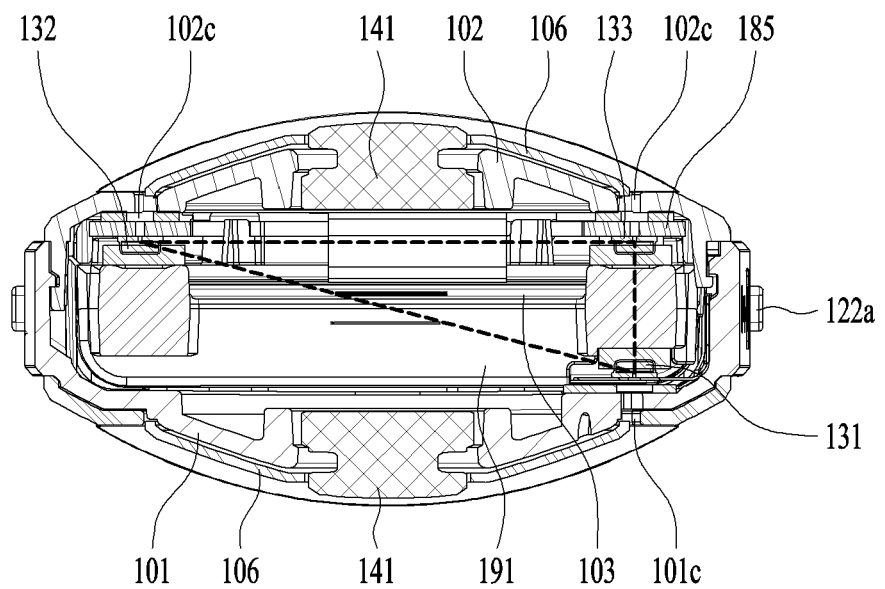
FIG. 5 illustrates an internal structure of a portable camera having its rear case detached therefrom in order to describe a location of a microphone module of the portable camera according to an embodiment of the present invention.

FIG. 5 illustrates a cross-sectional view taken along line A-A of FIG. 2A, wherein the positioning of the microphones 131, 132, and 133 according to an embodiment of the present invention is illustrated. In this exemplary embodiment, the microphone 130 is configured of a second microphone 132 and a third microphone 133 positioned on left and right portions and a first microphone 131 for acquiring sound received from an opposite direction. And, as shown in FIG. 5, the three microphones 131, 132, and 133 form a triangle and are distributed to the front surface and the rear surface and along a horizontal (left-and-right) direction. Since the main board 185 is positioned on the rear surface, two microphones 132 and 133 are positioned to face the direction of the rear surface, and one microphone 131 is positioned on the front surface. A button flexible board 187 may be used in order to be connected to the first microphone 131, which is positioned on the front surface.

As a path for the sound being inputted to the microphone 130, the microphone hole 102c is formed on the case. Referring to FIG. 2A and FIG. 2B, the microphone hole 102c is formed on positions of the front case and the rear case corresponding to the end portion of the camera decoration 106. Since the camera decoration 106 is protruded more than the case, it is advantageous in that the microphone hole 102c is not easily visible.

In order to position the second microphone 132 and the third microphone 133 on the left and right sides of the imaging unit 140, the main board 185 is protruded along the left and right sides of the imaging unit 140, thereby forming a U-shaped upper part, as shown in FIG. 3.

As the second microphone 132 and the third microphone 133 are horizontally spaced apart from one another (i.e., along the left-and-right direction) at a predetermined distance, in order to position the microphones 132 and 133 in positions corresponding to circumference of the camera decoration 106, the second microphone 132 and the third microphone 133 may be mounted on both protruded ends of the U-shaped main board 185.

Figure 6:
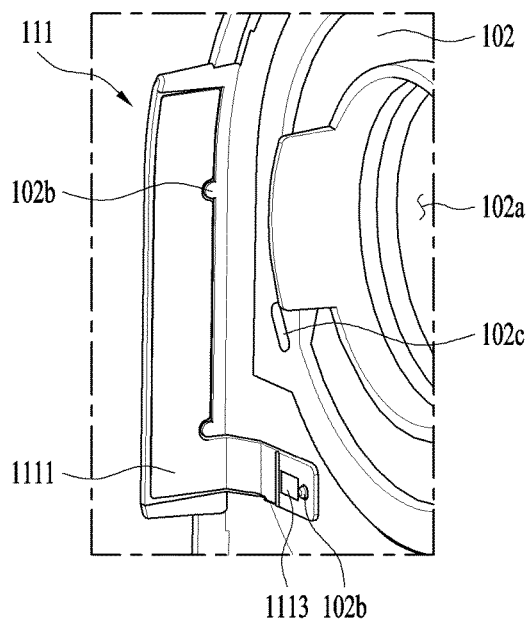
FIG. 6 illustrates an antenna according to an embodiment of the present invention.
Figure 7:
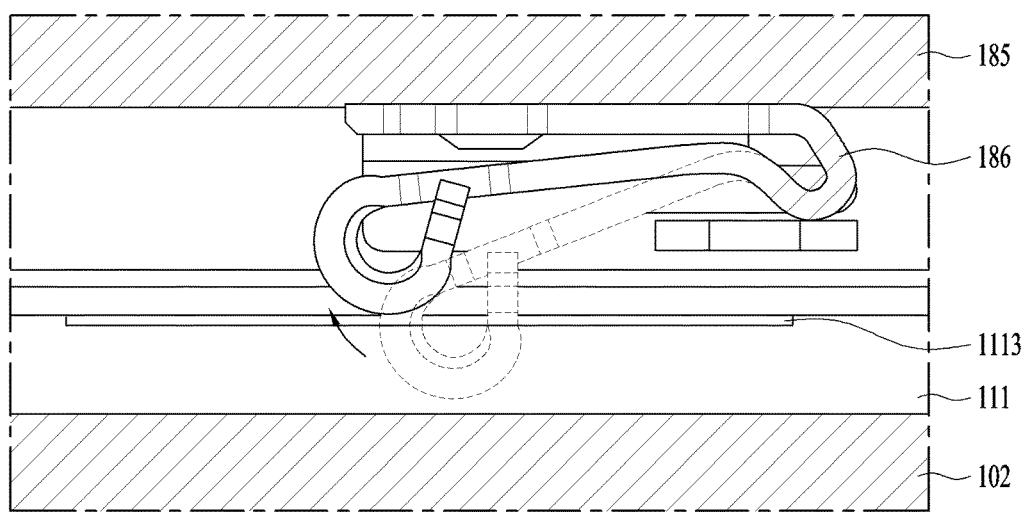
FIG. 7 illustrates a method for connecting an antenna and a main board according to an embodiment of the present invention.

FIG. 6 illustrates an antenna according to an embodiment of the present invention, and FIG. 7 illustrates a method for connecting the antenna and the main board 185 according to an embodiment of the present invention. The wireless communication unit 110 positions an antenna module 111, which is equipped with an emitter for emitting the signal, on a first case or a second case. In case of positioning the antenna module 111 inside the housing, since the radio signal is influenced by other electronic assembly parts, the antenna module 111 may be configured to by using a method attaching the antenna module 111 to the case or by using the case itself.

The antenna module 111 according to an embodiment of the present invention is positioned on the inner side of the rear case 102. If the antenna module 111 is positioned outside of the housing, a separate member covering the antenna module 111 is additionally required. However, if the antenna module 111 is positioned inside the housing, it will be advantageous in that the connection with the main board 185 may be more easily established, and it will also be advantageous in the aspect of water-resistance.

The antenna module 111 according to an embodiment of the present invention is configured of a pattern unit 1111 having an emission pattern and a terminal part 1113 for being connected to the main board 185. And, although the position of the pattern unit 1111 is not limited, the terminal part 1113 is positioned on the inner side of the rear surface of the housing in order to be connected to an elastic clip 186, which is mounted on the main board 185.

In order to attach the antenna module 111 inside the housing without any tolerance, a guidance projection 102b guiding the coupling of the antenna module 111 is formed on the inner surface of the housing, and a guidance recess may be formed on the antenna module 111 respective to the guidance projection 102b.

As described above, the portable camera according to an embodiment of the present invention may provide 360-degree panorama images without having to move the camera and may also minimize deformation (or distortion) in the panorama images, which occur in accordance with the rotation speed of the portable camera when capturing panorama images by moving the portable camera.

Furthermore, the related art fisheye lens may be used, and, since a pair of camera modules exists independently, and since only one of the camera modules may be replaced when carrying out maintenance and repair, this is more advantageous in light of the maintenance and repair of the portable camera.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A portable camera, comprising:
a housing having a front surface having a first opening and a rear surface having a second opening;
first and second camera decorations covering circumferences of the first and second openings, respectively, each of the first and second camera decorations having a donut shape;
a first microphone hole positioned at a gap between the front surface of the housing and an outer edge of the first camera decoration;
second and third microphone holes positioned at two gaps between the rear surface of the housing and an outer edge of the second camera decoration;
a first microphone positioned inside of the first microphone hole;
a second microphone positioned inside of the second microphone hole;
a third microphone positioned inside of the third microphone hole;
an imaging unit mounted inside the housing, the imaging unit including:
  first and second camera modules having first and second lens units exposed through the first and second openings, respectively;
  first and second coupling surfaces placed on opposite sides of the first and second lens units, respectively;
  first and second projections protruding from the first and second coupling surfaces, respectively; and
  a camera bracket positioned between the first and second camera modules, the camera bracket having:
    first and second surfaces contacting with the first and second coupling surfaces, respectively; and
    holes to receive the first and second projections therein, the first and second projection beings inserted at opposite sides of the holes, respectively;
a main board controlling the imaging unit inside the housing;
a battery positioned on a front surface of the main board; and a flexible board having a first part connected to the main board and positioned at a back surface of the battery and a second part positioned at a front surface of the battery, wherein the first microphone is mounted on the flexible board and the second and third microphones are mounted on the main board, and wherein the first, second and third microphone holes are arranged at three vertices of a right angle triangle.

2. The portable camera of claim 1, wherein the imaging unit includes first and second adhesive tapes positioned between the first and second camera modules, respectively, and the camera bracket.

3. The portable camera of claim 1, wherein each of the first and second camera modules includes a fisheye lens having an angle of coverage of 180 degrees or more, and wherein the main board is configured to:
correct any distortion occurring in images captured by the first and second camera modules, and
synthesize the corrected images, thereby providing a panorama image.

4. The portable camera of claim 1, wherein each of the first and second camera modules includes:

an imaging element recording light introduced through the lens unit;

a camera flexible board connecting the imaging element to the main board; and a camera connector positioned on an end portion of the camera flexible board and connected to the main board.

5. The portable camera of claim 4, wherein the camera connector of the first camera module is coupled to a front surface of the main board and the camera connector of the second camera module is coupled to a rear surface of the main board.

6. The portable camera of claim 1, further comprising an antenna module inside the housing.

7. The portable camera of claim 6, wherein the antenna module includes a pattern portion and a terminal portion extending from the pattern portion towards the rear surface of the housing, and wherein the main board includes an elastic clip mounted at a surface of the main board, the elastic clip contacting the terminal portion.

8. The portable camera of claim 6, further comprising:

a guidance projection protruding from an inner surface of the housing; and a guidance recess formed on the antenna module, the guidance recess corresponding to the guidance projection.

9. The portable camera of claim 1, wherein the imaging unit is positioned adjacent to an upper portion of the main board, wherein the main board has left and right projections extending along the imaging unit so as to form a U-shape at the upper portion, and wherein the second and third microphones are positioned on end portions of the left and right projections, respectively.

10. The portable camera of claim 9, further comprising:

a button positioned on the front surface of the housing; and a metallic dome positioned at a rear surface of the button so as to generate a signal when pressure is applied to the button, the metallic dome being positioned on the flexible board.

11. The portable camera of claim 1, further comprising a cap configured to cover the first and second openings simultaneously.

12. The portable camera of claim 11, wherein the housing includes a releasable hook, and wherein the cap includes a hook lock to receive the releasable hook.

13. The portable terminal of claim 1, further comprising a frame located inside the housing, the frame having a first surface opposite a second surface, wherein the main board is mounted to one of the first surface or the second surface.

14. The portable terminal of claim 13, wherein the battery is located at the other of the first surface or the second surface.

15. The portable terminal of claim 14, further comprising an interface located at the other of the first surface or the second surface.

* * * * *